United States Patent [19]

Harder

[11] Patent Number: 4,930,569
[45] Date of Patent: Jun. 5, 1990

[54] HEAT TRANSFER ELEMENT ASSEMBLY

[75] Inventor: William F. Harder, Wellsville, N.Y.

[73] Assignee: The Air Preheater Company, Inc., Wellsville, N.Y.

[21] Appl. No.: 426,363

[22] Filed: Oct. 25, 1989

[51] Int. Cl.⁵ ............................................. F28D 19/00
[52] U.S. Cl. ........................................ 165/10; 165/8
[58] Field of Search ...................................... 165/10, 8

[56] References Cited

U.S. PATENT DOCUMENTS

| | | |
|---|---|---|
| 1,823,481 | 9/1931 | Zander . |
| 2,023,965 | 12/1935 | Lysholm . |
| 2,438,851 | 3/1948 | Gates . |
| 2,596,642 | 5/1952 | Boestad . |
| 2,696,976 | 12/1954 | Boestad et al. . |
| 2,940,736 | 6/1960 | Odman ............ 165/10 |
| 2,983,486 | 5/1961 | Rosenberg . |
| 3,183,963 | 5/1965 | Mondt . |
| 3,463,222 | 8/1969 | Grames . |
| 3,756,310 | 7/1973 | Becker ............ 165/10 |
| 4,396,058 | 8/1983 | Kurschner et al. . |
| 4,449,573 | 5/1984 | Pettersson et al. ...... 165/10 |
| 4,512,389 | 4/1985 | Goetschius ............ 165/10 |
| 4,744,410 | 5/1988 | Groves ............ 165/10 |

FOREIGN PATENT DOCUMENTS 759598 11/1933 France .................................. 165/10

Primary Examiner—Albert W. Davis, Jr.
Attorney, Agent, or Firm—William W. Habelt

[57] ABSTRACT

A heat transfer element assembly (30) is comprised of a plurality of first and second profiled heat transfer plates (32,34) which incorporate a series of first and second single-lobed outwardly protruding notches (40,50) which extend obliquely relative to the general direction of fluid flow through the assembled plates. The first and second profiled heat transfer plates (32,34) are assembled alternately in juxtaposed relationship in a stacked array with the obliquely extending spacing notches (40,50) of neighboring plates crossing each other. The first and second profiled head transfer plates are provided with a plurality of first single-lobed notches (40) protruding outwardly from one side of the plate and a plurality of second single-lobed notches (50) protruding outwardly from the other side of the plate. The first and second single-lobed notches are arranged in staggered relationship with one or more second single-lobed notches (50) disposed between each pair of first single-lobed notches (40).

5 Claims, 2 Drawing Sheets

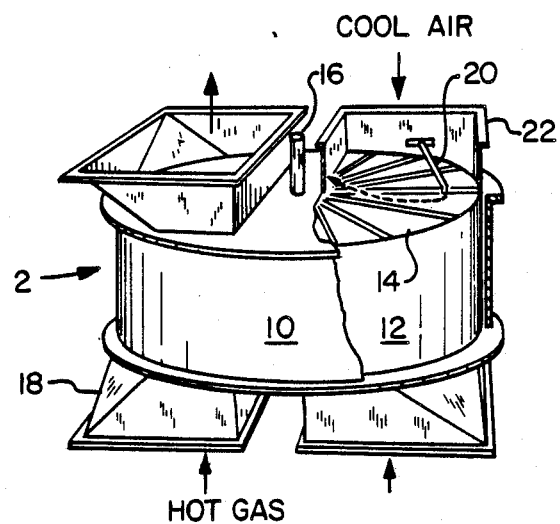
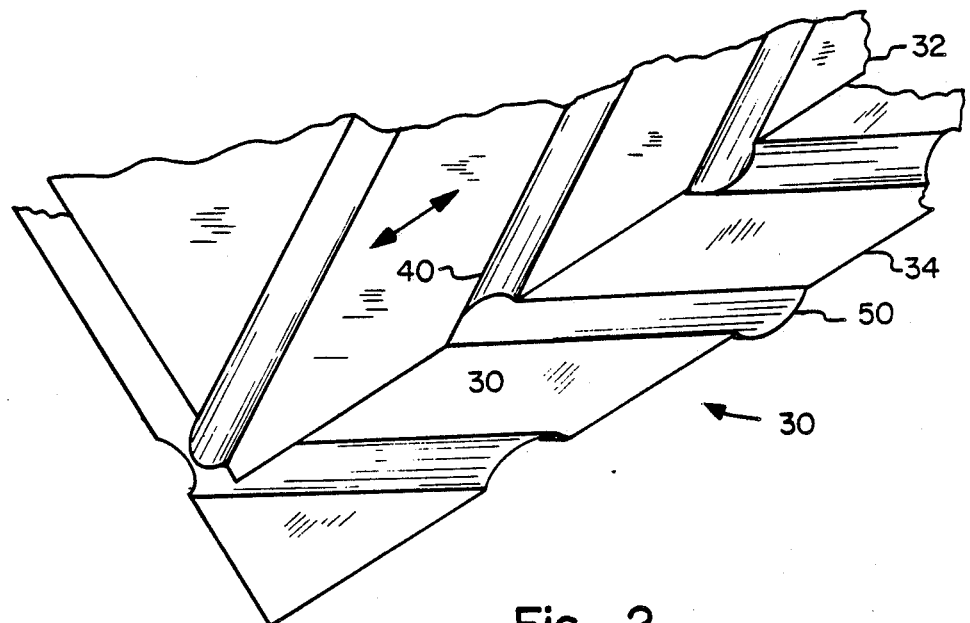
Fig. 2

HEAT TRANSFER ELEMENT ASSEMBLY

BACKGROUND OF THE INVENTION

The present invention relates to heat transfer element and, more specifically, to a heat transfer element assembly comprised of a stacked array of spaced absorbent plates for use in a rotary regenerative heat exchanger wherein the heat transfer element is heated by contact with the hot gaseous heat exchange fluid and thereafter brought in contact with a cool gaseous heat exchange fluid to which the heat transfer element gives up its heat.

One type of heat exchange apparatus to which the present invention has particular application is the well-known rotary regenerative heater. A typical rotary regenerative heater has a cylindrical rotor divided into compartments in which are disposed and supported assemblies of spaced heat transfer plates which as the rotor turns are alternately exposed to a stream of heating gas and then upon rotation of the rotor to a stream of cooler air or other gaseous fluid to be heated. As the heat transfer plates are exposed to the heating gas, they absorb heat therefrom and then, when exposed to the cool air or other gaseous fluid to be heated, the heat absorbed from the heating gas by the heat transfer plates is transferred to the cooler gas. Most heat exchangers of this type have their heat transfer plates closely stacked in spaced relationship to provide a plurality of passageways between adjacent plates for flowing the heat exchange fluid therebetween.

In such a heat exchanger, the heat transfer capability of a heat exchanger of a given size is a function of the rate of heat transfer between the heat exchange fluid and the plate structure. However, for commercial devices, the utility of a device is determined not alone by the coefficient of heat transfer obtained, but also by other factors such as the resistance to flow of the heat exchange fluid through the device, i.e., the pressure drop, the ease of cleaning the flow passages, the structural integrity of the heat transfer plates, as well as factors such as cost and weight of the plate structure. Ideally, the heat transfer plates will induce a highly turbulent flow through the passages therebetween in order to increase heat transfer from the heat exchange fluid to the plates while at the same time providing relatively low resistance to flow between the passages and also presenting a surface configuration which is readily cleanable.

To clean the heat transfer plates, it has been customary to provide soot blowers which deliver a blast of high pressure air or steam through the passages between the stacked heat transfer plates to dislodge any particulate deposits from the surface thereof and carry them away leaving a relatively clean surface. One problem encountered with this method of cleaning is that the force of the high pressure blowing medium on the relatively thin heat transfer plates can lead to cracking of the plates unless a certain amount of structural rigidity is designed into the stack assembly of heat transfer plates.

One solution of this problem is to crimp the individual heat transfer plates at frequent intervals to provide a series of folds or notches which extend substantially parallel to the flow of air or gas thereover and protrude outwardly away from the plate for a predetermined distance. Then when the plates are stacked together to form the heat transfer element, these folds serve not only to maintain adjacent plates at their proper distance from each other, but also to provide support between adjacent plates so that forces placed on the plates during the soot blowing operation can be equilibrated between the various plates making up the heat transfer element assembly. Heat transfer element configurations incorporating such spacer folds or notches which extend substantially parallel to the flow of air or gas through the element assembly, including single-lobed and bi-lobed notches, are disclosed for example in U.S. Pat. Nos. 1,823,481; 2,023,965: 2,438,851; 2,596,642; 2,696,976: 2,983,486; 3,463,222: 4,396,058: and 4,512,389.

However, in a heat transfer element assembly of the type wherein the heat transfer elements incorporate folds or notches which extend substantially parallel to the flow of air or gas through the element assembly, there exists the potential for nesting or partial nesting of adjacent plates. That is, the folds may become completely or partially superimposed on one another so that the spacing between adjacent plates is lost or substantially reduced thereby degrading heat transfer performance. This may occur from improper installation or movement of the plates relative to each other during normal operation or during the soot blowing procedure.

Such nesting may be precluded by having bi-lobed spacing notches or folds formed in the heat transfer element sheets extend obliquely relative to the general direction of the fluid flow through the assembled element. As disclosed in U.S. Pat. Nos. 3,183,963 and 4,449,573, element plates having such obliquely extending folds or notches are arranged in a stacked array with the folds or notches of adjacent plates crossing each other. Although such configurations do preclude nesting, they may be unnecessarily complicated.

SUMMARY OF THE INVENTION

The heat transfer element assembly of the present invention comprises a plurality of first and second profiled heat transfer plates which incorporate a series of first and second single-lobed outwardly protruding notches which extend obliquely relative to the general direction of fluid flow through the assembled plates. The first and second profiled heat transfer plates are assembled alternately in juxtaposed relationship in stacked array with the obliquely extending spacing notches of neighboring plates crossing each other.

Each of the first and second profiled heat transfer plates is provided with a plurality of first single-lobed notches protruding outwardly from one side of the plate and a plurality of second single-lobed notches protruding outwardly from the other side of the plate. The first and second single-lobed notches are arranged in staggered relationship with one or more second single-lobed notches disposed between each pair of first single-lobed notches.

BRIEF DESCRIPTION OF THE DRAWING

FIG. 1 is a perspective view of a rotary regenerative heat exchanger;

FIG. 2 is an enlarged perspective view, partly in section, of a heat transfer element assembly designed in accordance with the present invention;

DESCRIPTION OF A PREFERRED EMBODIMENT

Figure 3:
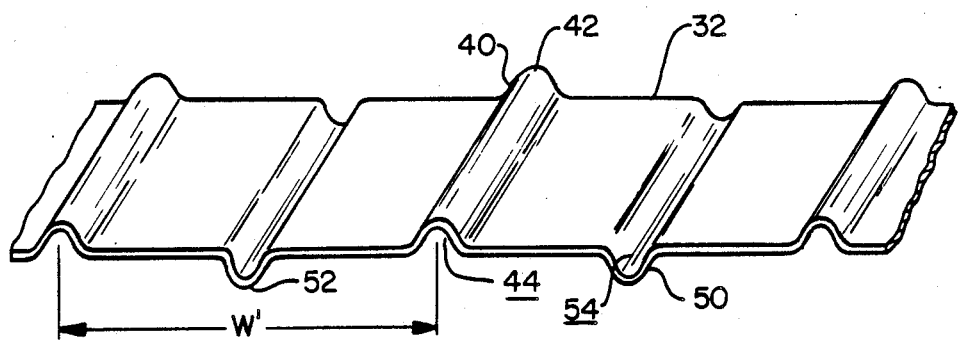
FIG. 3 is an end view of one embodiment of the profiled heat transfer plate of the present invention.

Referring now to the drawing and more particularly to FIG. 1, there is depicted therein a regenerative heat exchange apparatus 2 in which the heat transfer element assembly of the present invention may be utilized. The regenerative heat exchanger 2 comprises a housing 10 enclosing a rotor 12 wherein the heat transfer element assembly of the present invention is carried. The rotor 12 comprises a cylindrical shell 14 connected by radially extending partitions to the rotor post 16. A heating fluid enters the housing 10 through duct 18 while the fluid to be heated enters the housing 10 from the opposite end through duct 22.

The rotor 12 is turned about its axis by a motor connected to the rotor post 16 through suitable reduction gearing, not illustrated here. As the rotor 12 rotates, the heat transfer plates carried therein are first moved in contact with the heating fluid entering the housing through duct 18 to absorb heat therefrom and then into contact with the fluid to be heated entering the housing through duct 22. As the heating fluid passes over the heat transfer plates, the heat transfer plates absorb heat therefrom. As the fluid to be heated subsequently passes over the heat transfer plates, the fluid absorbs from the heat transfer plates the heat which the plates had picked up when in contact with the heating fluid.

As illustrated in FIG. 1, the regenerative heat exchanger 2 is often utilized as an air preheater wherein the heat absorbent element serves to transfer heat from hot flue gases generated in a fossil fuel-fired furnace to ambient air being supplied to the furnace as combustion air as a means of preheating the combustion air and raising overall combustion efficiency. Very often, the flue gas leaving the furnace is laden with particulate generated during the combustion process. This particulate has a tendency to deposit on the heat transfer plates particularly at the cold end of the heat exchanger where condensation of any moisture in the flue gas may occur.

In order to provide for periodic cleaning of the heat transfer element assembly, the heat exchanger is provided with a cleaning nozzle 20 disposed in the passage for the fluid to be heated adjacent the cold end of the rotor 12 and opposite the open end of the heat transfer element assembly. The cleaning nozzle 20 directs a high pressure cleaning fluid, typically steam, water, or air, through the plates as they rotate slowly while the nozzle itself sweeps across the end face of the rotor. As the high pressure fluid passes through the spaced heat transfer plates to vibrate so as to jar loose fly ash and other particulate deposits clinging thereto. The loosened particulate is then entrained in the high pressure fluid stream and carried out of the rotor.

Referring now to FIG. 2, there is depicted therein an embodiment of the heat transfer element assembly 30 designed in accordance with the present invention. As shown therein, the heat transfer element assembly is comprised of a plurality of first heat transfer plates 32 and a plurality of second heat transfer plates 34 stacked alternately in spaced relationship thereby providing a plurality of channel-like passageways 36 between adjacent first plates 32 and second plates 34. These passageways 36 provide a flow path for flowing a heat exchange fluid therebetween in heat exchange relationship with the plates. Spacers 38 are provided to maintain adjacent plates 32 and 34 a predetermined distance apart and keep flow passages 36 open.

Figure 4:
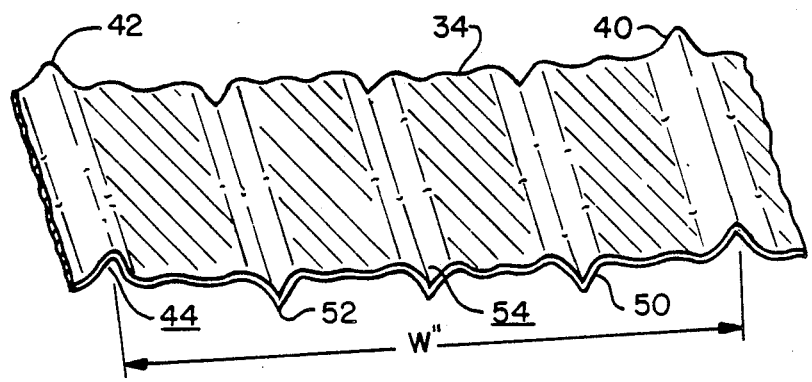
FIG. 4 is an end view of an alternate embodiment of the profiled heat transfer plate of the present invention.

The plates 32 and 34 are usually of thin sheet metal capable of being rolled or stamped to the desired configuration; however, the invention is not necessarily limited to use of metallic sheets. Such sheets may be of various surface configurations such as, but not limited to, a flat sheet as illustrated in FIG. 3 or a undulated sheet as illustrated in FIG. 4. Undulated plates provide a series of oblique furrows which are relatively shallow as compared to the distance between adjacent plates.

Both the first heat transfer plates 32 and the second heat transfer plates 34 are profiled, that is, provided with a series of first and second outwardly protruding notches 40 and 50 formed therein which extend obliquely across the length of the heat transfer plates relative to the general direction of flow along the length of the plates. The first and second outwardly protruding notches 40 and 50 extend substantially parallel to each other at an angle with respect to the leading edge 38 of the plates 32,34 of at least 40°, and preferably at least 55° and less than 75° for a flat sheet heat transfer plate such as illustrated in FIG. 3, and less than 70° for an undulated sheet as illustrated in FIG. 4. With the notches 40 and 50 so orientated with respect to the leading edge 38 of the plates 32,34, the notches 40 and 50 will extend obliquely at an angle between 20° and 50° with respect to the general direction of flow through the flow channels 36. The notches 40 and 50 may be formed by crimping the sheet-like plates 32 and 34 to produce outwardly protruding single-lobed ridges 42,52 which define grooves 44,54 extending obliquely across the first and second heat transfer plates 32,34 as herein described. The notches 40 and 50 are preferably of a symmetrical substantially V or U-like shape, although other shapes may be used so long as the notches 40 and 50 are single-lobed.

It is important that each of the first single-lobed ridges 40 in a heat transfer plate 32,34 be of the same height as all other ridges 40 in that plate, and that each of the second single-lobed ridges 50 in a heat transfer plate 32,34 be of the same height as all other ridges 50 in that plate. However, the height of the first single-lobed ridges 40 may be the same as or may be different from the height of the second single-lobed ridges 50. It is only necessary that the sum of the height of the first single-lobed notch 40 of the second heat transfer plates 34 and the height of the second single-lobed notch 50 of the first heat transfer plates 32 to equal to the desired spacing to be maintained between the alternately juxtaposed plates 32 and 34 when assembled in the stacked array of first and second heat transfer plates 32 and 34 as illustrated in FIG. 2 so as to provide and maintain flow channels 36 having the desired depth.

With respect to both the first heat transfer plates 32 and the second heat transfer plates 34, the first single-lobed notches 40 protrude outwardly in one direction at equally spaced intervals across the width thereof, while the second single-lobed notches 50 protrude outwardly in the opposite direction with at least one of the second single-lobed notches 50 disposed intermediate each pair of the first single-lobed notches 40. As best seen in FIGS. 3 and 4, the plurality of first single-lobed notches 40 are equally spaced apart at an interval W', and the plurality of first single-lobed notches 40 are equally spaced apart at an interval W'''. The intervals W' and W''' may be equal or they may be different in magnitude as desired in any given instance.

The second single-lobed notches 50 are disposed intermediate the first single-lobed notches 40 but protrude outwardly from the opposite side of the plates. If only one second notch 50 is disposed between a pair of neighboring first notches 40, the crest of the ridge 52 of the second notch 50 is disposed midway between the crests of the ridges 42 of the first notches 40 as illustrated in FIG. 3. When more than one second notch 50 is disposed between a pair of first notches 40, the second notches 50 are spaced apart at an interval equal to $W/X+1$, where X is the number of second notches 50 disposed between the pair of first notches 40.

It is to be understood that the first heat transfer plates 32 and the second heat transfer plates 34 need not be identical. For instance, the number of second notches disposed between each pair of first notches may be different for the first heat transfer plates 32 and the second heat transfer plates 34. In such case, the spacing between the second notches 50 in the first heat transfer plate 32 would be $W'/X'+1$, where X is the number of second notches 50 disposed between paired first notches 40. Similarly, the spacing between the second notches 50 in the second heat transfer plate 34 would be $W''/X''+1$, where X'' is the number of second notches 50 disposed between paired first notches 40 in the second heat transfer plates 34.

I claim:

1. An assembly of heat transfer element plates for a regenerative heat exchanger comprising: a plurality of first profiled heat transfer plates and a plurality of second profiled heat transfer plates, said first and second heat transfer plates stacked alternately in juxtaposed relationship so as to form a plurality of flow channels extending through said assembly between two opposite end surfaces of the stacked heat transfer plates, each of said first and second profiled heat transfer plates being provided with a plurality of first single-lobed notches protruding outwardly in one direction at spaced intervals across the width thereof and extending obliquely along the length thereof, and further being provided with a plurality of second single-lobed notches extending parallel to said plurality of first single-lobed notches and protruding outwardly in the opposite direction with at least one of said second single-lobed notches positioned intermediate each pair of said first single-lobed notches, said first and second plates being disposed within said assembly relative to each other with the first and second notches of said first plates extending transverse to the first and second notches of said second plates whereby the notches of adjacent plates cross each other at the points of contact therebetween.

2. An assembly of heat transfer element plates as recited in claim 1 wherein each of said first and second profiled heat transfer plates comprises a relatively thin metallic sheet.

3. An assembly of heat transfer element plates as recited in claim 2 wherein each of said first and second single-lobed notches comprises a symmetrically protruding ridge formed integrally in the metallic sheet.

4. An assembly of heat transfer element plates as recited in claim 1 wherein said plurality of first single-lobed notches are equally spaced apart in said first heat transfer element plates at an interval $W'$ and in said second heat transfer plates at an interval $W''$.

5. An assembly of heat transfer element plates as recited in claim 4 wherein said plurality of second single-lobed notches are disposed in said first heat transfer element plates at equally spaced intervals between each pair of neighboring first single-lobed notches therein at an interval of $W'/X'+1$, where X' equals the number of second single-lobed notches disposed between the pair of neighboring first single-lobed notches, and said plurality of second single-lobed notches are disposed in said second heat transfer element plates at equally spaced intervals between each pair of neighboring first lobed notches therein at an interval of $W''/X''+1$, where X'' equals the number of second single-lobed notches disposed between the pair of neighboring first single-lobed notches.

* * * * *